(12) United States Patent
Yoshihama et al.

(10) Patent No.: US 9,604,640 B2
(45) Date of Patent: Mar. 28, 2017

(54) COLLISION AVOIDANCE ASSISTANCE DEVICE

(75) Inventors: Yuki Yoshihama, Susono (JP); Toshinori Okita, Gotenba (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 249 days.

(21) Appl. No.: 14/386,203

(22) PCT Filed: Mar. 19, 2012

(86) PCT No.: PCT/JP2012/057054
§ 371 (c)(1),
(2), (4) Date: Dec. 17, 2014

(87) PCT Pub. No.: WO2013/140513
PCT Pub. Date: Sep. 26, 2013

(65) Prior Publication Data
US 2015/0094943 A1   Apr. 2, 2015

(51) Int. Cl.
| B60Q 1/00 | (2006.01) |
| E05F 15/00 | (2015.01) |
| G08G 1/16 | (2006.01) |
| B60W 30/095 | (2012.01) |
| B62D 15/02 | (2006.01) |
| B60W 30/09 | (2012.01) |

(52) U.S. Cl.
CPC ........ *B60W 30/0953* (2013.01); *B60W 30/09* (2013.01); *B62D 15/0265* (2013.01); *G08G 1/16* (2013.01); *B60W 2520/125* (2013.01); *B60W 2550/10* (2013.01)

(58) Field of Classification Search
CPC .............. B60W 30/0953; B60W 30/09; B62D 15/0265; G08G 1/16
USPC ......................................................... 701/301
See application file for complete search history.

(56) References Cited

U.S. PATENT DOCUMENTS

| 2006/0293856 A1* | 12/2006 | Foessel ................. B60W 30/09 |
| | | 701/301 |
| 2007/0109110 A1* | 5/2007 | Ohmura .............. B60R 21/0132 |
| | | 340/435 |
| 2011/0276227 A1 | 11/2011 | Sugawara et al. |

FOREIGN PATENT DOCUMENTS

| CN | 102209656 A | 10/2011 |
| DE | 102009012226 A1 | 9/2010 |
| DE | 102009020649 A1 | 11/2010 |
| JP | 2011051572 A | 3/2011 |
| JP | 2011210102 A | 10/2011 |

* cited by examiner

*Primary Examiner* — Adam Tissot
(74) *Attorney, Agent, or Firm* — Andrews Kurth Kenyon LLP

(57) ABSTRACT

Disclosed is a collision avoidance assistance device including: an assistance region setting unit is configured to set an assistance region in the vicinity of a vehicle based on a set lateral acceleration determined according to a vehicle speed during steering; and an assistance control unit is configured to permit collision avoidance assistance for the vehicle when an obstacle is detected within the assistance region.

6 Claims, 8 Drawing Sheets

Fig.6
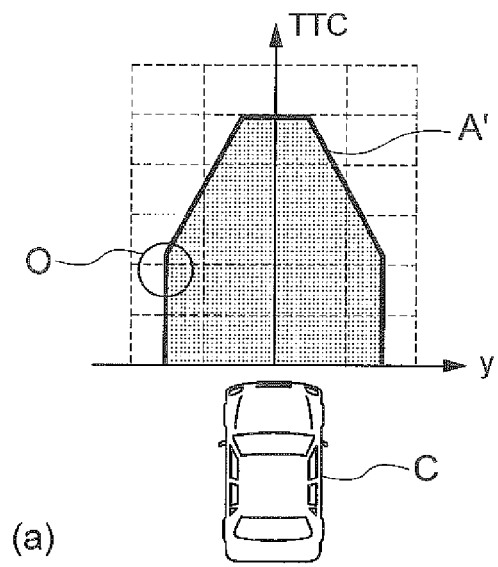
(a)
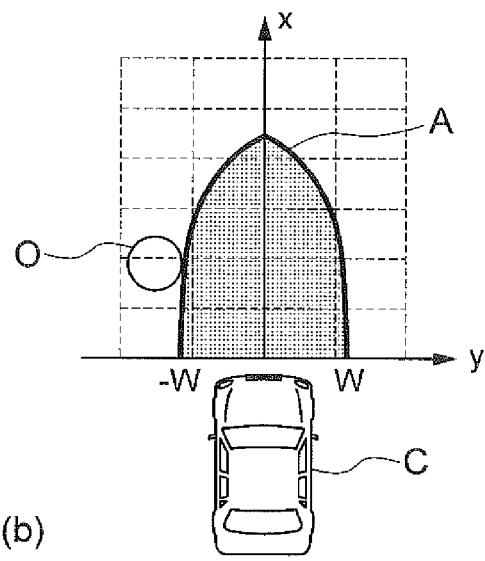
(b)
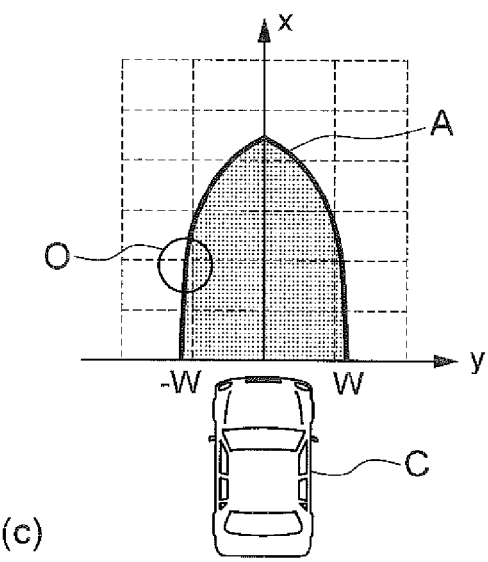
(c)

COLLISION AVOIDANCE ASSISTANCE DEVICE

CROSS-REFERENCE TO RELATED APPLICATIONS

This is a national phase application based on the PCT International Patent Application No. PCT/JP2012/057054, filed Mar. 19, 2012, the entire contents of which are incorporated herein by reference.

TECHNICAL FIELD

The present invention relates to a collision avoidance assistance device.

BACKGROUND ART

In the related art, for example, as disclosed in Japanese Unexamined Patent Application Publication No. 2011-210102, a drive assistance device such as a collision avoidance assistance device that performs collision avoidance assistance with respect to an obstacle present in the vicinity of a vehicle is known. When detecting a situation where a collision cannot be easily avoided by normal steering or braking, such a device executes the collision avoidance assistance by performing an alarm notification, a steering intervention, a braking intervention, an operation of a safety device, or the like.

CITATION LIST

Patent Literature

[Patent Literature 1] Japanese Unexamined Patent Application Publication No. 2011-210102

SUMMARY OF INVENTION

Technical Problem

However, in such a device, for example, when the vehicle approaches a road structure such as a guard rail while the vehicle is traveling on a curve path, the device may execute the collision avoidance assistance even in a situation where the collision can be easily avoided by normal steering. In this case, a passenger of the vehicle may feel uneasy about the execution of the assistance, or feel bothered by the execution of the assistance.

Accordingly, an object of the present invention is to provide a collision avoidance assistance device capable of appropriately executing the collision avoidance assistance.

Solution to Problem

According to the invention, there is provided a collision avoidance assistance device including: an assistance region setting unit configured to set an assistance region in the vicinity of a vehicle based on a set lateral acceleration determined according to a vehicle speed during steering; and an assistance control unit configured to permit collision avoidance assistance for the vehicle when an obstacle is detected within the assistance region.

In the collision avoidance assistance device according to the invention, the assistance region is set in the vicinity of the vehicle based on the set lateral acceleration determined according to the vehicle speed during steering. Further, when the obstacle is detected within the assistance region, the collision avoidance assistance of the vehicle is permitted. Here, the set lateral acceleration is set based on a steering characteristic of a driver during normal turning, that is, a maximum value of a lateral acceleration observed (maximum lateral acceleration) when the driver performs steering during the normal turning. This is because it is considered that the driver performs steering so as not to exceed the maximum lateral acceleration even when the collision is avoided by the normal steering. The maximum lateral acceleration becomes smaller as the vehicle speed becomes larger, depending on the vehicle speed during turning.

By setting the set lateral acceleration based on the maximum lateral acceleration, a region where the collision cannot be avoided by the normal steering, that is, a region where the collision cannot be easily avoided unless a steering operation for exceeding the maximum lateral acceleration is performed can be set as the assistance region. By permitting the collision avoidance assistance when the obstacle is detected within the assistance region, the collision avoidance assistance can be executed only in a situation where the collision cannot be easily avoided by the normal steering. Accordingly, in the situation where the collision can be easily avoided by the normal steering, the execution of inappropriate assistance is suppressed. Thus, it is possible to suppress a passenger of the vehicle from feeling uneasy about the execution of the assistance or feeling bothered about the execution of the assistance.

Here, the assistance region setting unit may be configured to further set the assistance region based on a time until a lateral acceleration of the vehicle reaches the set lateral acceleration. Thus, an appropriate assistance region in which a steering characteristic is reflected can be set.

Further, the assistance region setting unit may further set the assistance region based on a lateral interval set in a vehicle width direction. Thus, an appropriate assistance region where the lateral interval in the vehicle width direction is secured can be set.

In addition, the assistance region setting unit may be configured to set the assistance region based on a turning locus of the vehicle. Thus, an appropriate assistance region can be set based on the turning locus of the vehicle. Here, the assistance region may be set based on an approximate equation of a clothoid curve.

More specifically, the assistance region setting unit may be configured to set the assistance region based on the following equation:

$$y = Gyd \cdot x^3 / (6T \cdot Vs^3) - W$$

where y represents a distance from the center of a front surface of the vehicle in a vehicle width direction, Gyd represents the set lateral acceleration, x represents a distance from the center of the front surface of the vehicle in a traveling direction, T represents a time until a lateral acceleration of the vehicle reaches the set lateral acceleration, Vs represents the vehicle speed, and W represents the lateral interval.

In addition, the assistance region setting unit may be configured to update the setting of the assistance region based on a lateral acceleration that varies during turning of the vehicle. Thus, an optimal assistance region can be set according to the lateral acceleration that varies during turning of the vehicle. Furthermore, the assistance region setting unit may be configured to update the setting of the assistance region to become narrower toward the vehicle as the lateral acceleration of the vehicle becomes larger.

Advantageous Effects of Invention

According to the invention, it is possible to provide a collision avoidance assistance device capable of appropriately executing collision avoidance assistance.

BRIEF DESCRIPTION OF DRAWINGS

FIG. 6 is a diagram illustrating a comparison of the operation of the collision avoidance assistance device with a related art.

DESCRIPTION OF EMBODIMENTS

Figure 1:
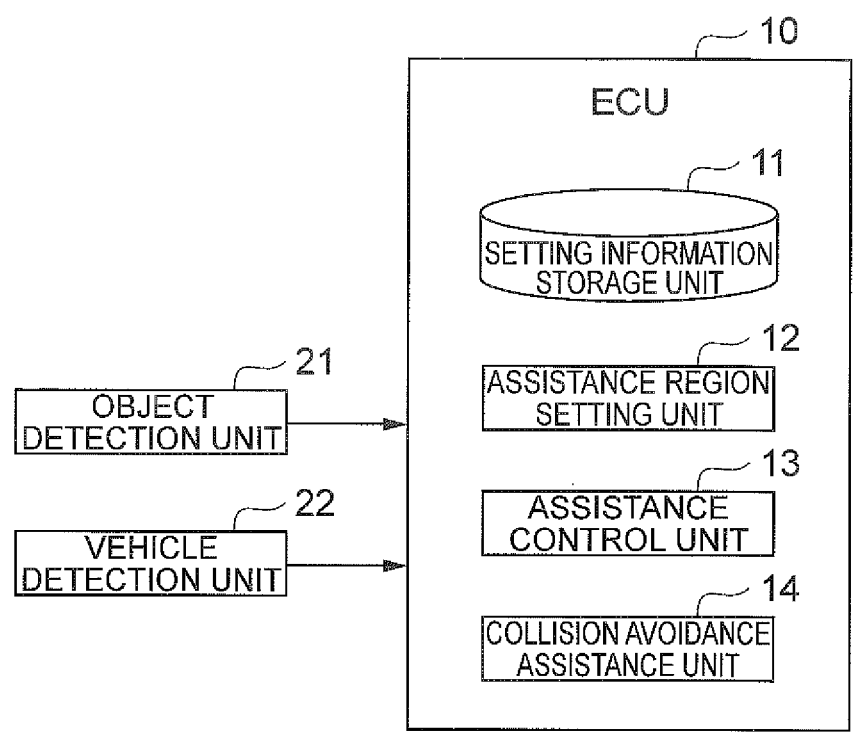
FIG. 1 is a block diagram illustrating a configuration of a collision avoidance assistance device according to a first embodiment.

Hereinafter, embodiments of the invention will be described in detail with reference to the accompanying drawings. In description of the drawings, the same reference numerals are given to the same components, and repetitive description will not be made.

Hereinafter, a collision avoidance assistance device according to a first embodiment of the invention will be described with reference to FIGS. 1 to 6. The collision avoidance assistance device according to the first embodiment sets an assistance region in the vicinity of a vehicle based on a set lateral acceleration Gyd determined according to a vehicle speed Vs during steering, and permits assistance of collision avoidance of the vehicle when an obstacle is detected within the assistance region.

First, a configuration of the collision avoidance assistance device according to the first embodiment will be described with reference to FIGS. 1 to 4.

FIG. 1 is a block diagram illustrating the configuration of the collision avoidance assistance device according to the first embodiment. As shown in FIG. 1, the collision avoidance assistance device is realized as an electronic control unit (ECU) 10 mounted on a vehicle. The ECU 10 is connected to an object detection unit 21 and a vehicle speed detection unit 22 through an on-vehicle bus (not shown).

The object detection unit 21 detects an object in the vicinity of the vehicle, particularly, in front of the vehicle. As the object detection unit 21, a millimeter wave radar sensor or the like may be used. The object detection unit 21 transmits radio waves to the periphery of the vehicle, and receives the radio waves reflected from a peripheral object to detect the object. Thus, a relative distance of the peripheral object from the vehicle, a relative speed thereof with respect to the vehicle, or the like is detected. As the object detection unit 21, a camera sensor that captures the peripheral object as an image may be used.

The vehicle speed detection unit 22 detects the speed of the vehicle. As the vehicle speed detection unit 22, a wheel speed sensor or the like is used.

The ECU 10 includes a setting information storage unit 11, an assistance region setting unit 12, an assistance control unit 13, and a collision avoidance assistance unit 14. The ECU 10 includes a CPU, a ROM, a RAM, and the like (not shown). The CPU develops a program stored in the ROM or the like into the RAM to execute the program, thereby realizing functions of the setting information storage unit 11, the assistance region setting unit 12, the assistance control unit 13, and the collision avoidance assistance unit 14. The setting information storage unit 11, the assistance region setting unit 12, the assistance control unit 13, and the collision avoidance assistance unit 14 are not only realized by the ECU 10, and may also be realized by a combination with another computer, an electric circuit, or the like.

The setting information storage unit 11 stores setting information to be used in setting of the assistance region. The assistance region is set as a region for assisting the collision avoidance, as described later. The setting information includes the set lateral acceleration Gyd, a relaxing curve portion passing time T, and a lateral interval W. Hereinafter, a method of setting the set lateral acceleration Gyd will be described with reference to FIGS. 2 and 3.

Figure 2:
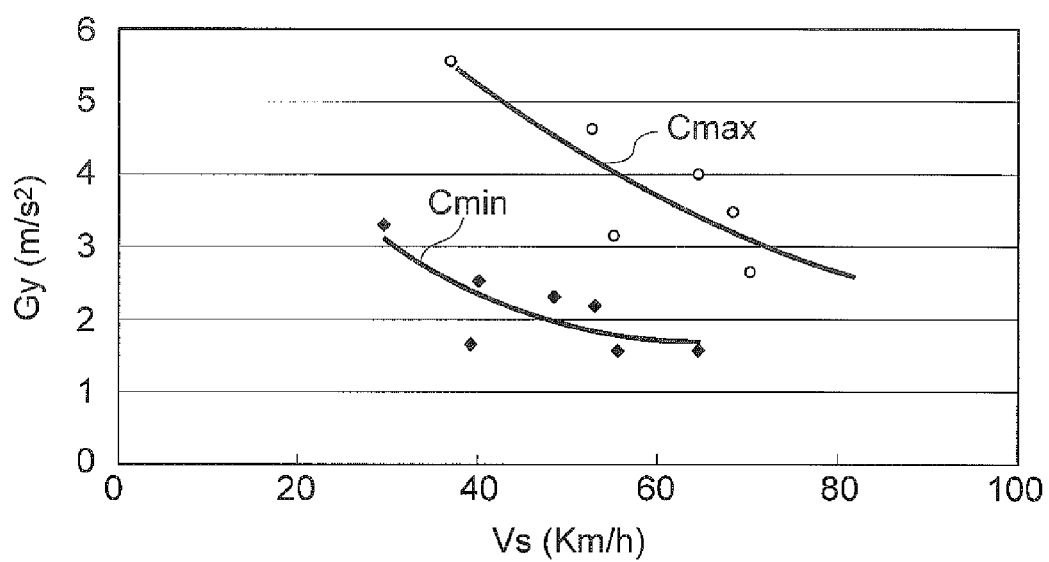
FIG. 2 is a diagram illustrating the relationship between a vehicle speed and a lateral acceleration during normal turning.

FIG. 2 is a diagram illustrating the relationship between a vehicle speed Vs and a lateral acceleration Gy during a normal turning operation. FIG. 2 shows approximate curves Cmax and Cmin indicating a maximum value and a minimum value, with respect to the vehicle speed Vs, of the lateral acceleration Gy observed by a running test on curve paths of a variety of curvature radii. This means that a driver performs steering so as not to exceed the maximum value (maximum lateral acceleration) of the lateral acceleration Gy during the normal turning operation. As shown in FIG. 2, the lateral acceleration Gy depends on the vehicle speed Vs during the turning operation, and decreases as the vehicle speed Vs increases.

Figure 3:
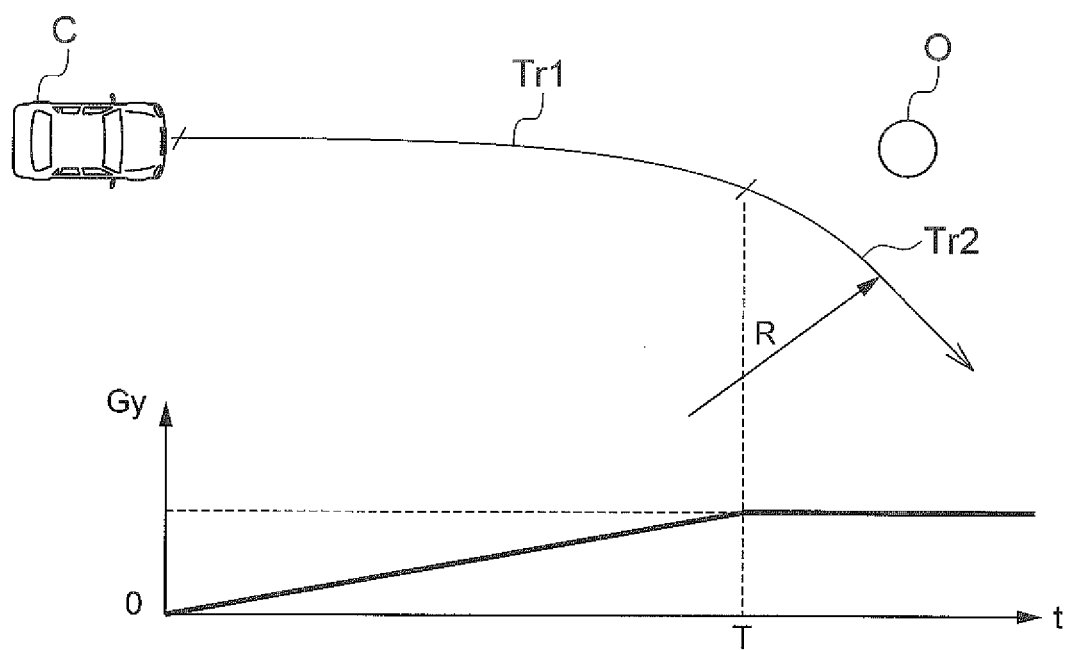
FIG. 3 is a diagram illustrating the relationship between a traveling locus and a lateral acceleration of a vehicle when a collision is avoided by normal steering.

FIG. 3 is a diagram illustrating the relationship between a traveling locus of a vehicle C and a lateral acceleration Gy when a collision is avoided by normal steering. As shown in FIG. 3, when the collision with an obstacle O is avoided by the normal steering, the traveling locus of the vehicle C includes a relaxing curve portion Tr1 including a smooth locus. Here, when the collision is avoided at a constant steering speed and the vehicle speed Vs, the relaxing curve portion Tr1 becomes a clothoid curve portion indicated by a clothoid curve.

Particularly, when the collision is avoided while the vehicle is traveling on a curve path, the traveling locus of the vehicle C includes a bent portion Tr2 (circular arc portion of curvature radius R) continuous to the relaxing curve portion Tr1. In this case, the lateral acceleration Gy acts on the vehicle C from the start of traveling in the relaxing curve portion Tr1, and the maximum value of the lateral acceleration Gy acts on the vehicle C at the end of the traveling in the relaxing curve portion Tr1, that is, at the beginning of the traveling in the bent portion Tr1 In the bent portion Tr2, the maximum value of the lateral acceleration Gy continuously acts on the vehicle C.

Based on the above description, the set lateral acceleration Gyd is set to regulate the maximum value of the lateral acceleration Gy that acts on the vehicle C at the end of the traveling in the relaxing curve portion Tr1. Further, the set lateral acceleration Gyd is set based on the maximum value (maximum lateral acceleration) of the lateral acceleration Gy during the normal turning operation, that is, according to the vehicle speed Vs during steering based on the relationship shown in FIG. 2. The setting information storage unit 11 stores a data map indicating the relationship shown in FIG. 2, or the like, for example.

Further, the relaxing curve portion passing time T is set as a time required for the traveling in the relaxing curve portion, particularly in the clothoid curve portion. The relaxing curve portion passing time T corresponds to a steering continuation time (increasing time of a turning angle of a steering wheel) until the lateral acceleration Gy reaches the set lateral acceleration Gyd from 0.0 G. The relaxing curve portion passing time T is set from 2.0 seconds to 4.0 seconds, for example, 3.0 seconds as a temporary value, in consideration of a road linearity design standard, a sensory assessment result of steering of the driver, or the like. The relaxing curve portion passing time T may be adapted to a suitable value in consideration of shock due to the lateral acceleration Gy, a steering speed, responsiveness of the lateral acceleration Gy to steering, or the like.

Further, the lateral interval W is a lateral distance in a vehicle width direction, which is set in advance as a distance obtained by adding a margin distance w to ½ of a vehicle width B. The margin distance w is a clearance secured between a side surface of the vehicle and an obstacle. The margin distance w is set from 0.2 m to 1.0 m, for example, 0.5 m, as a temporary value, in consideration of a minimum value of a proximity distance where a driver feels a collision risk, or the like. In this case, if it is assumed that the vehicle width is B=1.4 m, the lateral interval w is set to W=1.2 m (=1.44÷2+0.5) The margin distance w may be adapted to a suitable value in consideration of the vehicle speed Vs, a situation of a traveled road, or the like.

The assistance region setting unit 12 sets an assistance region in the vicinity of the vehicle, particularly, in front of the vehicle based on the set lateral acceleration Gyd determined according to the vehicle speed Vs during steering. The assistance region is set as a region where a collision cannot be easily avoided by normal steering, that is, a region where the collision cannot be easily avoided unless a steering operation of exceeding the maximum lateral acceleration is performed. The assistance region may also be understood as a region where an obstacle is not present within the region as long as the collision is avoided by the normal steering. Accordingly, a situation where the obstacle is present within the assistance region means a situation where the necessity of the collision avoidance assistance is high.

The assistance region setting unit 12 acquires vehicle speed information and setting information from the vehicle speed detection unit 22 and the setting information storage unit 11, respectively, and sets the assistance region based on the information. The assistance region setting unit 12 sets the assistance region when the vehicle turns by steering, that is, when or immediately before the traveling in the relaxing curve portion starts. The assistance region in the present embodiment is set as a certain region while the vehicle is traveling on the curve path or in the relaxing curve portion.

Figure 4:
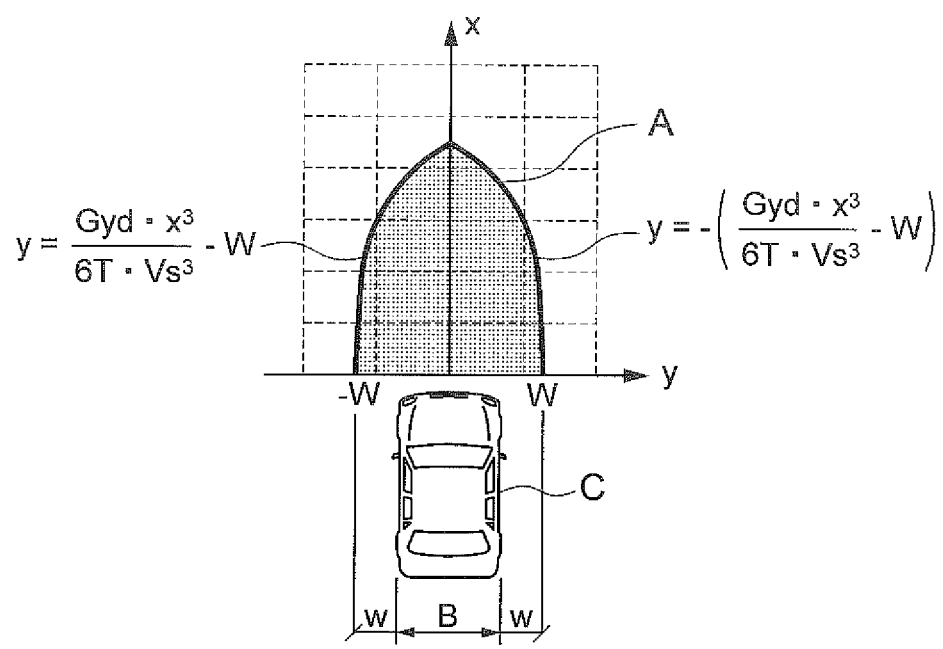
FIG. 4 is a diagram illustrating a setting example of an assistance region.

FIG. 4 is a diagram illustrating a setting example of an assistance region. As shown in FIG. 4, an assistance region A is set as a tip-tapered or a bullet-shaped region that extends from a front surface of the vehicle C in the traveling direction.

Assuming that an x axis (relative distance) represents a distance from the center of the front surface of the vehicle C in the traveling direction and a y axis (lateral position) represents a distance from the center of the front surface of the vehicle C in the vehicle width direction, a boundary between the assistance region A and a non-assistance region is determined by approximate equations of clothoid curves as shown in the following equations (1L) and (1R). The equation (1L) and the equation (1R) respectively determine the boundaries in a negative region (left front side of the vehicle C in the example shown in FIG. 4) on the y axis and in a positive region (similarly, right front side of the vehicle C) on the y axis. The assistance region A is set as a region interposed between the locus when the vehicle turns left and the locus when the vehicle turns right, and particularly, set as a region (hatched region in FIG. 4) interposed between the equation (1L) and the equation (1R).

$$y = x^3/(6R \cdot L) - W \quad (1L)$$

$$y = -\{x^3/(6R \cdot L) - W\} \quad (1R)$$

Here, R represents a curvature radius of the bent portion continuous to the relaxing curve portion, L represents a section length of the relaxing curve portion, and W represents a lateral interval. The curvature radius R of the bent portion is obtained by dividing a square value of the vehicle speed Vs by the set lateral acceleration Gyd ($R=Vs^2/Gyd$). The section length L of the relaxing curve portion is obtained by multiplying the relaxing curve portion passing time T by the vehicle speed Vs ($L=T \cdot Vs$). The lateral interval W is obtained by adding the lateral margin distance w to ½ of the vehicle width B (W=B/2+w). Accordingly, the equations (1L) and (1R) are replaced with equations (2L) and (2R).

$$y = Gyd \cdot x^3/(6T \cdot Vs^3) - W \quad (2L)$$

$$y = -\{Gyd \cdot x^3/(6T \cdot Vs^3) - W\} \quad (2R)$$

The assistance control unit 13 permits the collision avoidance assistance for avoiding the collision. The assistance control unit 13 determines whether an object detected by the object detection unit 21 is an obstacle based on the detection result of the object detection unit 21. If the obstacle is detected, the assistance control unit 13 determines whether to execute the assistance based on comparison of the assistance region A set by the assistance region setting unit 12 with the position of the obstacle detected by the object detection unit 21. The assistance control unit 13 permits the collision avoidance assistance when the obstacle is detected within the assistance region A, and does not permit the collision avoidance assistance when the obstacle is not detected.

The collision avoidance assistance unit 14 executes the collision avoidance assistance for avoiding the collision. The collision avoidance assistance unit 14 executes the assistance when the collision avoidance assistance is permitted. On the other hand, the collision avoidance assistance unit 14 does not execute the assistance when the collision avoidance assistance is not permitted. It the collision avoidance assistance is permitted, the collision avoidance assistance unit 14 executes the collision avoidance assistance by an alarm notification, a steering intervention, a braking intervention, an operation of a safety device, or the like.

Figure 5:
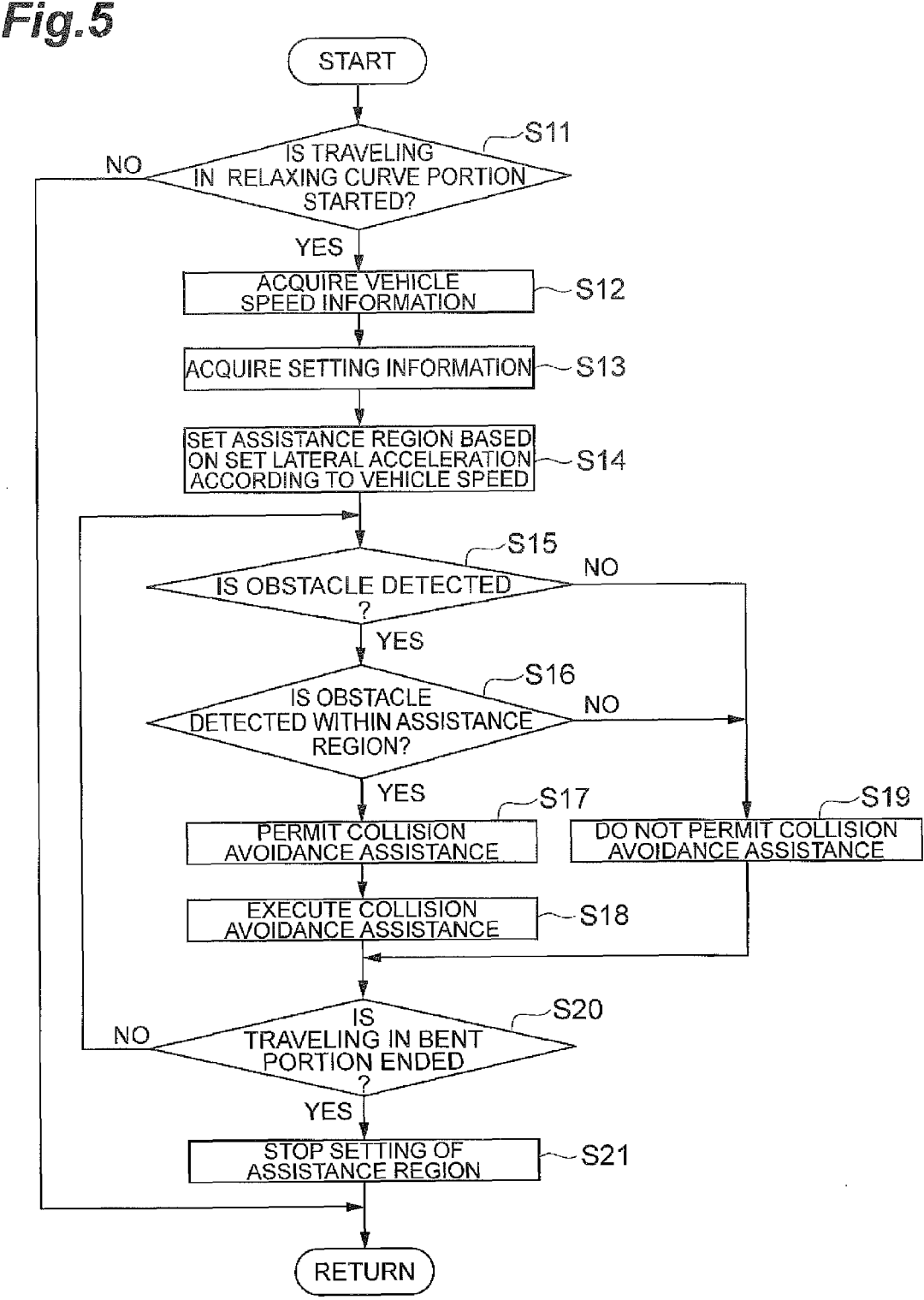
FIG. 5 is a flowchart illustrating an operation of the collision avoidance assistance device according to the first embodiment.

Next, the operation of the collision avoidance assistance device according to the first embodiment will be described with reference to FIGS. 5 and 6. FIG. 5 is a flowchart illustrating the operation of the collision avoidance assistance device according to the first embodiment. The ECU 10 repeatedly executes processes shown in FIG. 5 at a predetermined cycle.

As shown in FIG. 5, the assistance region setting unit 12 determines whether the vehicle C turns due to steering, that is, whether the vehicle C starts the traveling in the relaxing curve portion (step S11). The start of the traveling in the relaxing curve portion Tr1 may be determined based on a change situation of a steering angle, for example, or may be predicted based on a detection situation of an object in the object detection unit 21.

If it is determined in step S11 that the traveling in the relaxing curve portion is started, the assistance region setting unit 12 acquires the vehicle speed information from the vehicle speed detection unit 22 (S12). Then, the assistance region setting unit 12 acquires the setting information from the setting information storage unit 11, that is, the set lateral acceleration Gyd determined according to the vehicle speed Vs during steering, the relaxing curve portion passing time T and the lateral interval W (S13). Further, the assistance region setting unit 12 substitutes the setting information in the Equations (2L) and (2R) to set the assistance region in front of the vehicle based on the set lateral acceleration Gyd determined according to the vehicle speed Vs during steering (S14).

If the assistance region is set, the assistance control unit 13 starts collision avoidance assistance control. The assistance control unit 13 determines whether an obstacle is detected by the object detection unit 21 (S15). If it is determined in S15 that the obstacle is detected, the assistance control unit 13 further determines whether the obstacle is detected within the assistance region (S16).

Further, if it is determined that the obstacle is detected within the assistance region, the assistance control unit 13 permits the collision avoidance assistance (S17), and the collision avoidance assistance unit 14 executes the collision avoidance assistance (S18). On the other hand, if it is not determined that the obstacle is detected within the assistance region, the assistance control unit 13 does not permit the collision avoidance assistance (S19).

Further, if the assistance region is set, the assistance region setting unit 12 determines whether the vehicle ends the traveling on the curve path, that is, in the bent portion or the relaxing curve portion (S20). The ending of the traveling in the bent portion or the relaxing curve portion is also determined by the same method as in the start of the traveling in the relaxing curve portion. Further, if it is determined in step S20 that the traveling in the bent portion or the relaxing curve portion ends, the assistance region setting unit 12 stops the setting of the assistance region (S21). The collision avoidance assistance device repeats the processes of steps S15 to S19 until the end of the traveling in the bent portion or the relaxing curve portion is determined in step S20.

FIG. 6 is a diagram illustrating a comparison of the operation of the collision avoidance assistance device with a related art. As shown in FIG. 6(a), in the related art, an assistance region A' is set in front of the vehicle C based on a predicted time-to-collision (TTC) according to the vehicle speed Vs. Accordingly, if an obstacle O' is detected within the assistance region A', even in a situation where the collision can be easily avoided by the normal steering, the assistance may be executed. In this case, a passenger of the vehicle C feels uneasy about the execution of the assistance, or feels bothered about the execution of the assistance.

On the other hand, as shown in FIGS. 6(a) and 6(b), in the collision avoidance assistance device according to the present embodiment, the assistance region A is set in front of the vehicle C based on the above-mentioned setting information. Here, the assistance region A is set as the region where the collision cannot be easily avoided by the normal steering. Further, since the collision avoidance assistance is permitted when the object O is detected within the assistance region A, the collision avoidance assistance is executed only when the collision cannot be easily avoided by the normal steering.

For example, in FIG. 6(b), since the obstacle O is not detected within the assistance region A, the collision avoidance assistance is not executed. This is because the collision of the obstacle O can be easily avoided by the normal steering in the state shown in FIG. 6(b). On the other hand, in FIG. 6(c), since the vehicle further approaches the obstacle O and the obstacle O is detected within the assistance region A, the collision avoidance assistance is executed. This is because the collision of the obstacle O cannot be easily avoided by the normal steering in the state shown in FIG. 6(c).

As described above, according to the collision avoidance assistance device according to the first embodiment of the invention, the region where the collision cannot be easily avoided by the normal steering based on the set lateral acceleration Gyd is determined according to the vehicle speed Vs during steering. Further, when the obstacle is detected within the assistance region, the collision avoidance assistance is permitted to execute the collision avoidance assistance only when the collision cannot be easily avoided by the normal steering. Accordingly, when the collision cannot be easily avoided by the normal steering, the execution of inappropriate assistance is suppressed. Thus, it is possible to prevent the passenger of the vehicle from feeling uneasy about the execution of the assistance or feeling bothered about the execution of the assistance.

Further, the assistance region may be set based on the time T until the lateral acceleration Gy of the vehicle reaches the set lateral acceleration Gyd. Thus, an appropriate assistance region in which a steering characteristic is reflected can be set.

In addition, the assistance region may be set based on the lateral interval W set in the vehicle width direction. Thus, an appropriate assistance region in which the lateral interval W in the vehicle width direction is secured can be set.

In addition, the assistance region may be set based on the turning locus of the vehicle. Thus, an appropriate assistance region may be set based on the turning locus of the vehicle. Here, the assistance region may be set based on an approximate equation of a clothoid curve.

Furthermore, the assistance region may be set based on the equation of $y = Gyd \cdot x^3 / (6T \cdot Vs^3) - W$, where y represents the distance from the center of the front surface of the vehicle in the vehicle width direction, Gyd represents the set lateral acceleration, x represents the distance from the front surface of the vehicle in the traveling direction, T represents the time until the lateral acceleration of the vehicle reaches the set lateral acceleration, Vs represents the vehicle speed, and W represents the lateral interval.

Hereinafter, a collision avoidance assistance device according to a second embodiment of the invention will be described. The collision avoidance assistance device according to the second embodiment updates setting of an assistance region according to a lateral acceleration that varies during turning of a vehicle.

Hereinafter, the collision avoidance assistance device according to the second embodiment will be described with reference to FIGS. 7 and 8. Hereinafter, repetitive description with the first embodiment will not be made.

Figure 7:
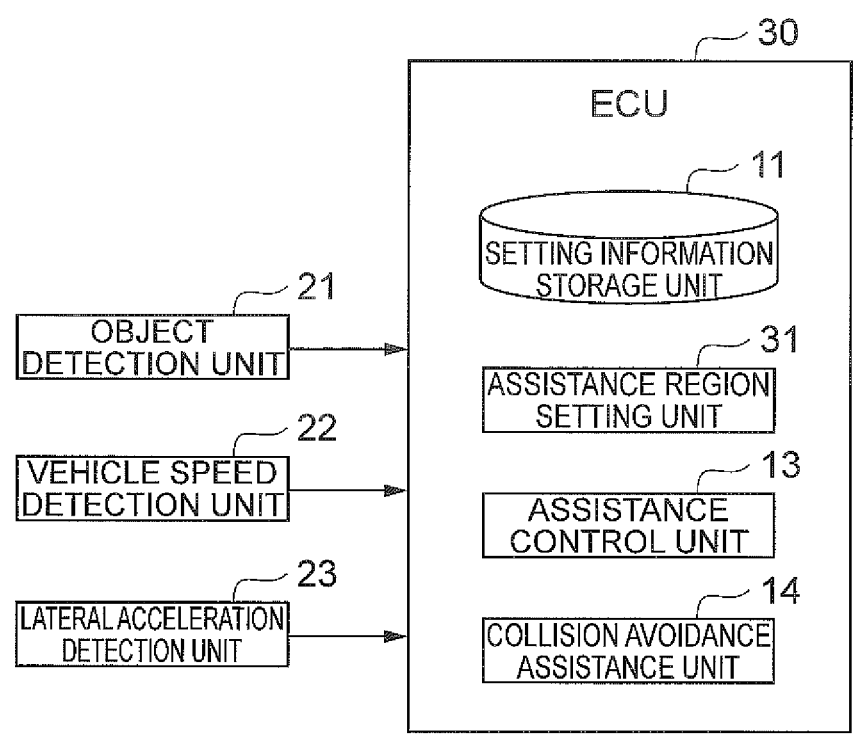
FIG. 7 is a block diagram illustrating a configuration of a collision avoidance assistance device according to a second embodiment.

FIG. 7 is a block diagram illustrating a configuration of the collision avoidance assistance device according to the second embodiment. As shown in FIG. 7, in the collision avoidance assistance device, an ECU 10 is connected to an object detection unit 21, a vehicle speed detection unit 22, and a lateral acceleration detection unit 23. The lateral acceleration detection unit 23 detects a lateral acceleration of a vehicle. An acceleration sensor or the like may be used as the lateral acceleration detection unit 23.

The ECU 10 includes a setting information storage unit 11, an assistance region setting unit 31, an assistance control unit 13, and a collision avoidance assistance unit 14. Functions of the setting information storage unit 11, the assistance control unit 13, and the collision avoidance assistance unit 14 are the same as in the first embodiment.

The assistance region setting unit 31 sets an assistance region in front of the vehicle based on a set lateral acceleration Gyd determined according to a vehicle speed Vs when steering, and updates the setting of the assistance region according to a lateral acceleration Gy that varies during turning. The assistance region setting unit 12 sets the assistance region when the vehicle turns by steering, that is, when or immediately before the vehicle starts traveling in a relaxing curve portion, and updates the setting of the assistance region based on lateral acceleration information acquired from the lateral acceleration detection unit 23 while the vehicle is traveling in the relaxing curve portion and the bent portion. That is, the assistance region of the present embodiment sets the relaxing curve portion and the bent portion as a variable region when traveling.

Figure 8:
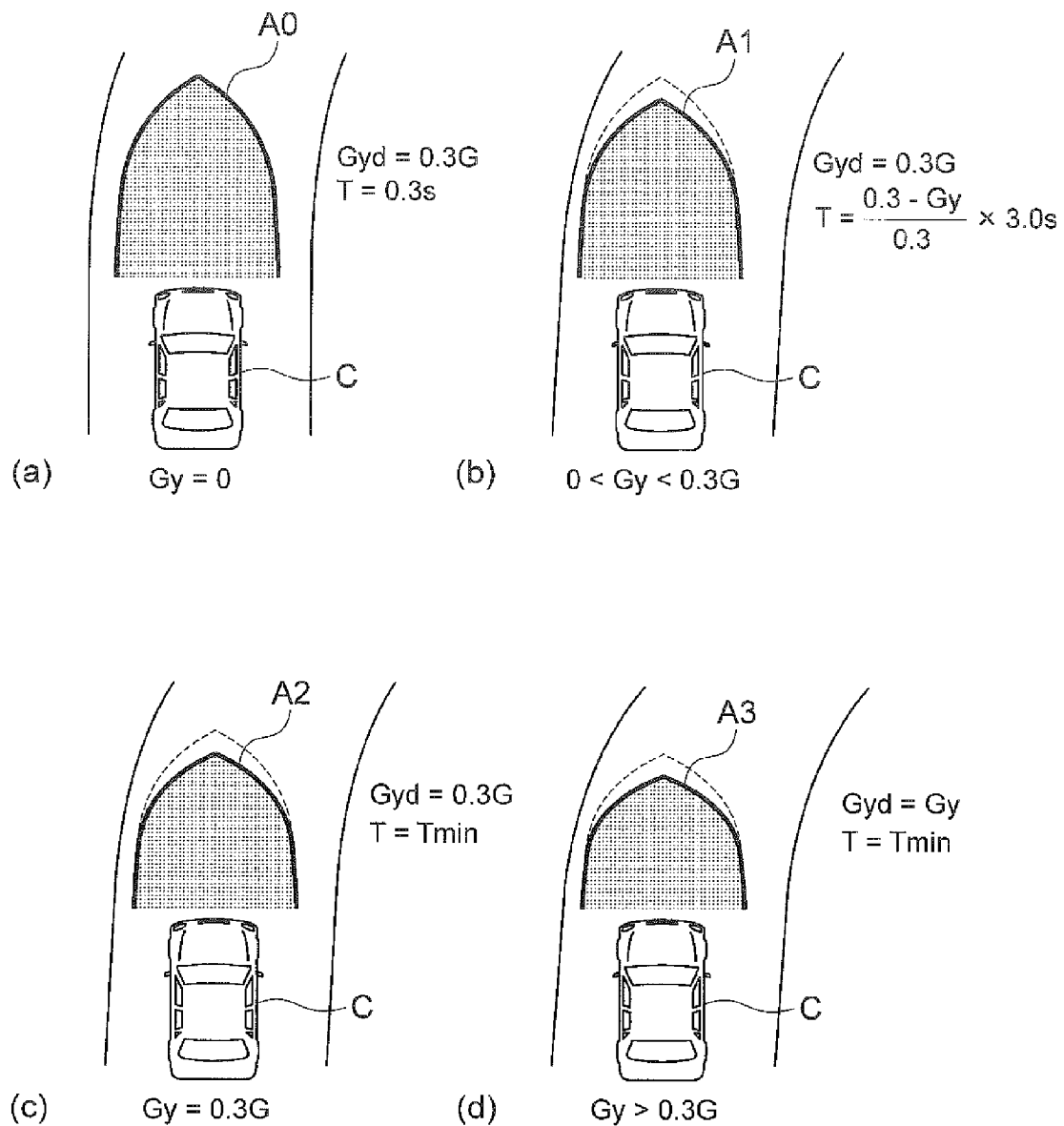
FIG. 8 is a diagram illustrating an updated example of an assistance region according to a lateral acceleration that varies during a turning operation.

FIG. 8 is a diagram illustrating an updated example of an assistance region A according to the lateral acceleration Gy that varies during turning of the vehicle. In the example shown in FIG. 8, it is assumed that the set lateral acceleration Gyd is 0.3 G, the relaxing curve portion passing time T is 3.0 seconds, and the lateral interval W is 1.2 m.

First, when the vehicle C turns by steering, that is, immediately before the vehicle starts the traveling in the relaxing curve portion, an assistance region A0 is set by substituting Gyd=0.3 G, T=3.0 seconds, and W=1.2 m in Equations (2L) and (2R), as shown in FIG. 8(a).

Then, the setting of the assistance region A is updated according to the lateral acceleration Gy that varies during turning as shown in FIG. 8(b), while the vehicle C is traveling in the relaxing curve portion, that is, until the lateral acceleration Gy that acts on the vehicle C reaches 0.3 G from 0.0 G. Here, an assistance region A1 until the lateral acceleration Gy reaches 0.3 G is set by substituting Gyd=0.3 G and T=(0.3−Gy)/0.3×3.0 seconds in Equations (2L) and (2R).

If T≅0 is substituted in Equations (2L) and (2R), the assistance region A becomes smaller compared with a case where the vehicle turns normally at a constant lateral acceleration Gy. Thus, strictly, the relaxing curve portion passing time T is given as T=(0.3−Gy)/0.3×(3.0−Tmin)+Tmin seconds. Here, Tmin is given as Tmin≅0.3 seconds in the updated example shown in FIG. 8, for example, so that the same assistance region A as in a case where the vehicle turns normally is set.

Then, at a point of time when the vehicle ends the traveling in the relaxing curve portion and starts the traveling in the bent portion, that is, when the lateral acceleration Gy acting on the vehicle C reaches 0.3 G an assistance region A2 is set by substituting Gyd=0.3 G and T=Tmin in Equations (2L) and (2R), as shown in FIG. 8(c).

In addition, when the driver intentionally continues the steering after the vehicle C starts the traveling in the bent portion and the lateral acceleration Gy acting on the vehicle Cy exceeds 0.3 G, an assistance region A3 is set by substituting Gyd=Gy and T=Tmin in Equations (2L) and (2R), as shown in FIG. 8(d).

In this way, the setting of the assistance region A is updated to become narrower toward the vehicle C as the lateral acceleration Gy acting on the vehicle C becomes larger while the vehicle C is traveling in the relaxing curve portion and the bent portion.

As described above, according to the collision avoidance assistance device according to the second embodiment of the invention, by updating the setting of the assistance region according to the lateral acceleration Gy that varies during turning of the vehicle, an optimal assistance region can be set according to the lateral acceleration Gy that varies during turning. Here, the setting of the assistance region may be updated to become narrower toward the vehicle as the lateral acceleration Gy of the vehicle becomes larger.

The above-described embodiments are described as preferred embodiments of the collision avoidance assistance device according to the invention, but the collision avoidance assistance device according to the invention is not limited to the description of the present embodiments. The collision avoidance assistance device may include modifications of the collision avoidance assistance device according to the present embodiments in a range without departing from the scope of the invention disclosed in respective claims, and may be applied to other devices.

In addition, the invention may be similarly applied to a program for appropriately executing the collision avoidance assistance using the above-described method, and to a computer-readable recording medium that stores the program.

REFERENCE SIGNS LIST

10: ECU
11: Setting information storage unit
12, 31: Assistance region setting unit
13: Assistance control unit
14: Collision avoidance assistance unit
21: Object detection unit
22: Vehicle speed detection unit
23: Lateral acceleration detection unit
C: Vehicle
A, A0 to A3: Assistance region

The invention claimed is:

1. A collision avoidance assistance device comprising:
an electronic control unit (ECU) including a CPU configured to execute programs stored in memory of the ECU, an assistance region setting unit, and an assistance control unit, wherein
the assistance region setting unit configured to set an assistance region in the vicinity of a vehicle based on a set lateral acceleration determined according to a vehicle speed during steering; and
the assistance control unit configured to permit collision avoidance assistance for the vehicle when an obstacle is detected within the assistance region,
wherein the assistance region setting unit is configured to set the assistance region based on the following equation:

$$y = Gyd \cdot x^3 / (6T \cdot Vs^3) - W$$

where y represents a distance from the center of a front surface of the vehicle in a vehicle width direction, Gyd represents the set lateral acceleration, x represents a distance from the center of the front surface of the vehicle in a traveling direction, T represents a time until a lateral acceleration of the vehicle reaches the set lateral acceleration, Vs represents the vehicle speed, and W represents the lateral interval.

2. The collision avoidance assistance device according to claim 1,
wherein the assistance region setting unit is configured to further set the assistance region based on a time until a lateral acceleration of the vehicle reaches the set lateral acceleration.

3. The collision avoidance assistance device according to claim 1,
wherein the assistance region setting unit is configured to further set the assistance region based on a lateral interval set in a vehicle width direction.

4. The collision avoidance assistance device according to claim 1,
wherein the assistance region setting unit is configured to set the assistance region based on a turning locus of the vehicle.

5. The collision avoidance assistance device according to claim 1,
wherein the assistance region setting unit is configured to update the setting of the assistance region based on a lateral acceleration that varies during a turning of the vehicle.

6. The collision avoidance device according to claim 5,
wherein the assistance region setting unit is configured to update the setting of the assistance region to become narrower toward the vehicle as the lateral acceleration of the vehicle becomes larger.

* * * * *